Jan. 23, 1968  H. L. BOURNER  3,364,887
INCINERATOR
Filed April 11, 1966  10 Sheets-Sheet 2

INVENTOR.
HOWARD L. BOURNER
BY
Cushman, Darby & Cushman
ATTORNEYS

INVENTOR.
HOWARD L. BOURNER
Cushman Darby & Cushman
ATTORNEYS

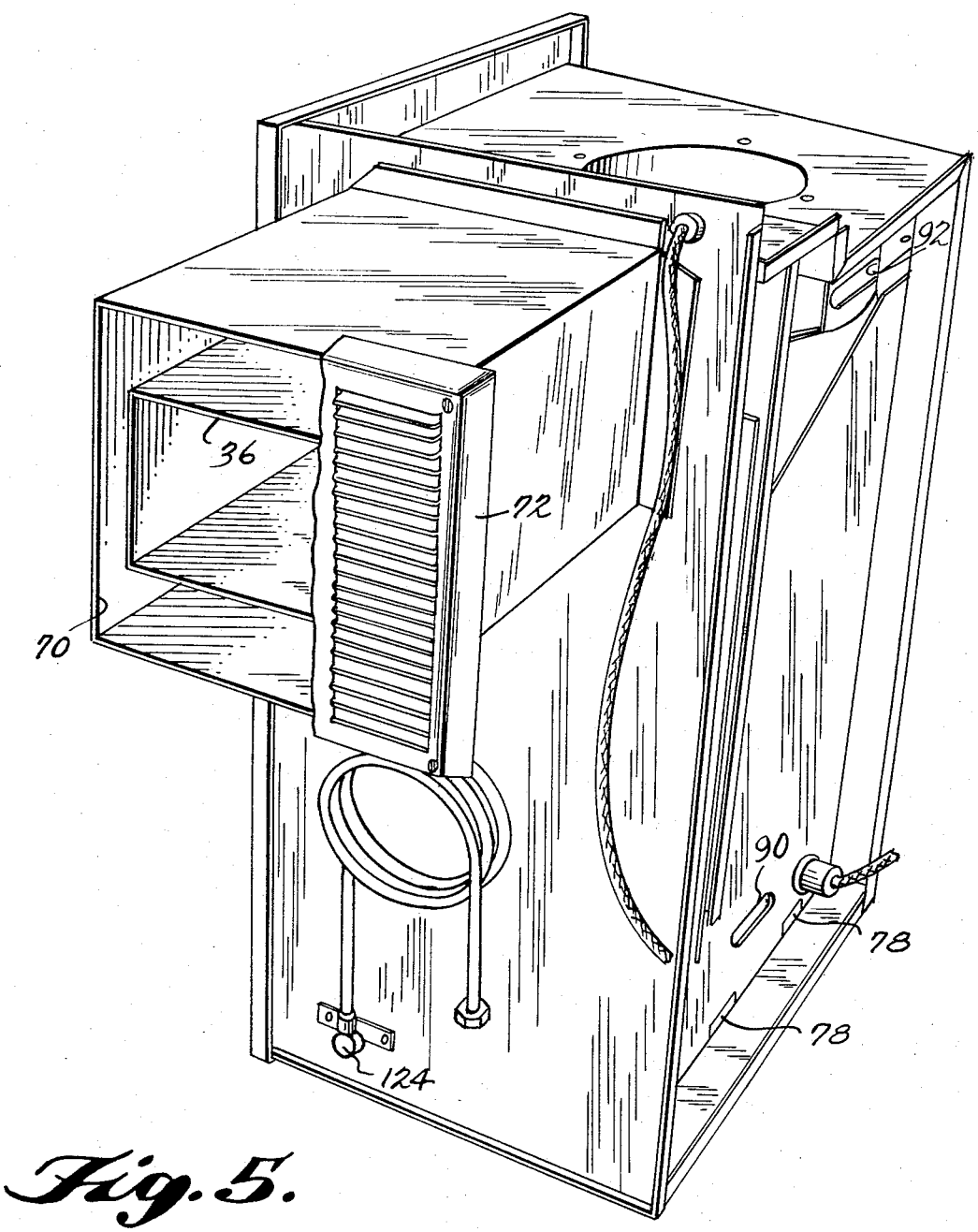

INVENTOR.
HOWARD L. BOURNER
BY
Cushman Darby Cushman
ATTORNEYS

Jan. 23, 1968 H. L. BOURNER 3,364,887
INCINERATOR
Filed April 11, 1966 10 Sheets-Sheet 7

INVENTOR.
HOWARD L. BOURNER
BY
Cushman, Darby & Cushman
ATTORNEYS

Jan. 23, 1968  H. L. BOURNER  3,364,887
INCINERATOR

Filed April 11, 1966  10 Sheets-Sheet 9

INVENTOR
HOWARD L. BOURNER
BY
Cushman, Darby & Cushman
ATTORNEYS

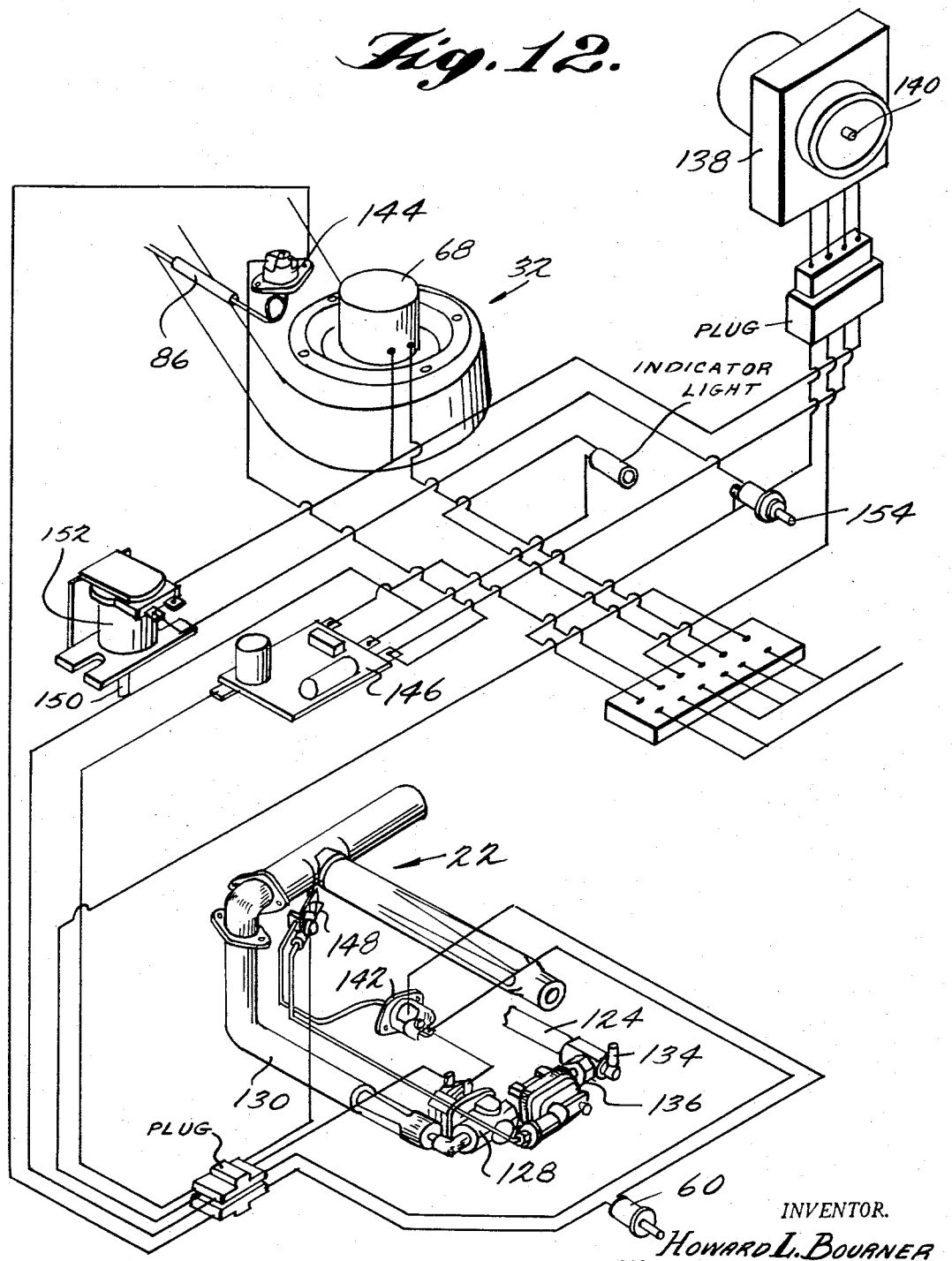

United States Patent Office 3,364,887
Patented Jan. 23, 1968

3,364,887
INCINERATOR
Howard L. Bourner, 1204 Elmwood,
Nashville, Tenn. 37212
Continuation-in-part of application Ser. No. 437,467,
Mar. 5, 1965. This application Apr. 11, 1966, Ser.
No. 541,724
9 Claims. (Cl. 110—8)

This application is a continuation-in-part of my pending application Serial No. 437,467, filed Mar. 5, 1965, now abandoned.

This invention relates to an incinerator apparatus and is particularly concerned with an incinerator which is hermetically sealed from the atmosphere in a room and which can be safely installed and used in a household for burning refuse.

Prior incinerator constructions for household installation have had serious limitations in use because of the inherent danger in installing a high temperature-producing, gas-fired apparatus, in a kitchen or similar living area in a home. Such constructions usually are vented to the atmosphere through some type of chimney device, and they depend upon room air for sufficient oxygen to support combustion in the incinerator itself. As a result, it is necessary for air inlets to be included in the incinerator construction so as to receive room air into the combustion zone within the incinerator. When refuse is burned, there is a possibility of some of the combustion products and gases associated with the burning operation being backfired or backdrafted into the room where the incinerator is installed. This disadvantage has limited the acceptability of incinerators for household use, and no real solution to the problem has been developed prior to this invention.

The incinerator of this invention provides for a highly efficient burning unit which can be installed within a kitchen or other room, and which receives all of its combustion air from the environment outside of the building in which the incinerator is installed. Accordingly, the incinerator can be hermetically or tightly sealed so as to prevent the transfer of any gases or odors from within the incinerator to the room where it is installed. The construction of the sealed incinerator of this invention provides for a safe and effective device which meets the requirements of the American Gas Association for such household devices.

As described in my previous application Serial No. 437,467, filed Mar. 5, 1965, the incinerator of this invention may be gas-fired, but alternatively, an electric heating means may be used for igniting and burning the refuse contained within the incinerator. The cabinet structure of the incinerator provides for a cooling of the cabinet walls so as to make installation safer and less costly than heretofore possible. Hot exhaust gases may be vented directly through the outside wall of a building, and novel means are provided for substantially reducing the temperature of the exhaust gases prior to their exit from the incinerator unit, thus eliminating the usual requirement for a costly chimney or extensive insulating construction. The burning action within the incinerator is made more efficient by providing a first combustion zone for igniting and initially burning the refuse, together with a second combustion zone for providing an after-burning action to the products from the first zone. A blower means is included in the upper part of the cabinet structure to draw cooling air in and around the cabinet walls and to blow the accumulated air past an exhaust vent from the second combustion zone of the incinerator. The blower is so related to the combustion zones that a venturi action is created by the movement of the blower air past the burning zones, and this draws additional air through the combustion chambers and into the exhaust system of the incinerator. The addition of a considerable volume of blower air to the exhaust gases from the incinerator reduces the temperatures of those gases substantially so as to provide for a safe exit of the combustion products through the chimney or other device which communicates with the outside atmosphere.

Since the incinerator is hermetically sealed from the interior of the room in which it is installed, it is necessary to provide for air inlets into the incinerator housing from the environment external to the house where the incinerator is located. A special construction of the incinerator unit provides for the entrance of outside atmospheric air into the unit without interrupting the hermetic barrier which is established between the incinerator and the interior of the home. In order to provide an adequate supply of air to the combustion burner units of the incinerator, a communication duct is provided by this invention between the blower housing and the burner units so that air may be taken off from the blower air stream and positively moved downwardly into the area of the burner units to support combustion. The air duct may include damper means or other control devices for regulating the flow of air from the blower to the burners.

A special feature of the present invention is the provision of a subassembly unit containing the incinerator burners and all associated connections. The subassembly unit is constructed to permit the complete removal of the burners and their connections to a source of gas, together with regulator devices associated with supplying gas to the burners. The subassembly unit is in the form of a tray containing the burner elements, and the tray can be easily removed from the base portion of the incinerator for service or inspection of the burner members. Two burners are included in the incinerator for separately firing the first and second combustion zones; however, the two burners are interconnected into a unitary assembly contained within the subassembly tray which is removable from the base of the incinerator. This feature facilitates the removal of the entire subassembly with its associated connections without the necessity for separately removing any part of the burning apparatus carried within the assembly.

Further embodiments of this invention will describe constructions for incinerators which are not required to be hermetically sealed from a room atmosphere, and any of the embodiments of this invention may incorporate an electric heating means in place of a gas-fired burner means.

In addition to the advantages mentioned above, and as set forth in my prior application as identified above, the incinerator unit of this invention is rugged in construction and economical in maintenance and use. The unit may be economically manufactured and is adaptable for use in combination with existing kitchen cabinet structures so as to easily fit into the usual space provided for cabinets in kitchens. Other advantages of this invention will become apparent in the more detailed discussion which follows.

In the more detailed discussion of the invention, reference will be made to the accompanying drawings in which:

FIGURE 5 is a rear perspective view of the incinerator apparatus with certain portions of the housing removed and showing the exhaust duct structure and means for receiving air into the unit from an outside atmosphere;

FIGURE 12 is a schematic illustration of the wiring and control devices associated with the entire incinerator apparatus.

Referring to the figures, the incinerator apparatus is shown as including a cabinet housing 10 which serves to enclose and insulate the burning zone within the device from adjoining structures. The housing 10 may be in any form, but it is preferred that it be of such dimensions that the entire incinerator apparatus may be fitted in a kitchen, with a top portion of the housing matching the height of the usual floor cabinets installed in kitchens. The housing cabinet includes a counter top 12 and a front door 14 which may be mounted for pivotal swinging movement on a vertical axis. The front door 14 provides access to the interior of the housing and to a refuse receiving receptacle within the housing. As will be discussed in greater detail later, the entire incinerator is constructed to meet American Gas Association requirements for sealed combustion devices. This means that the incinerator is essentially hermetically sealed. The hermetically sealed incinerator, of this invention, draws all of its air for cooling and for combustion from the atmosphere outside of the building in which it is installed, and all exhaust products are vented to the outside atmosphere with no possibility of any interchange of gases between the incinerator and the air in the room where it is located.

Figure 2:
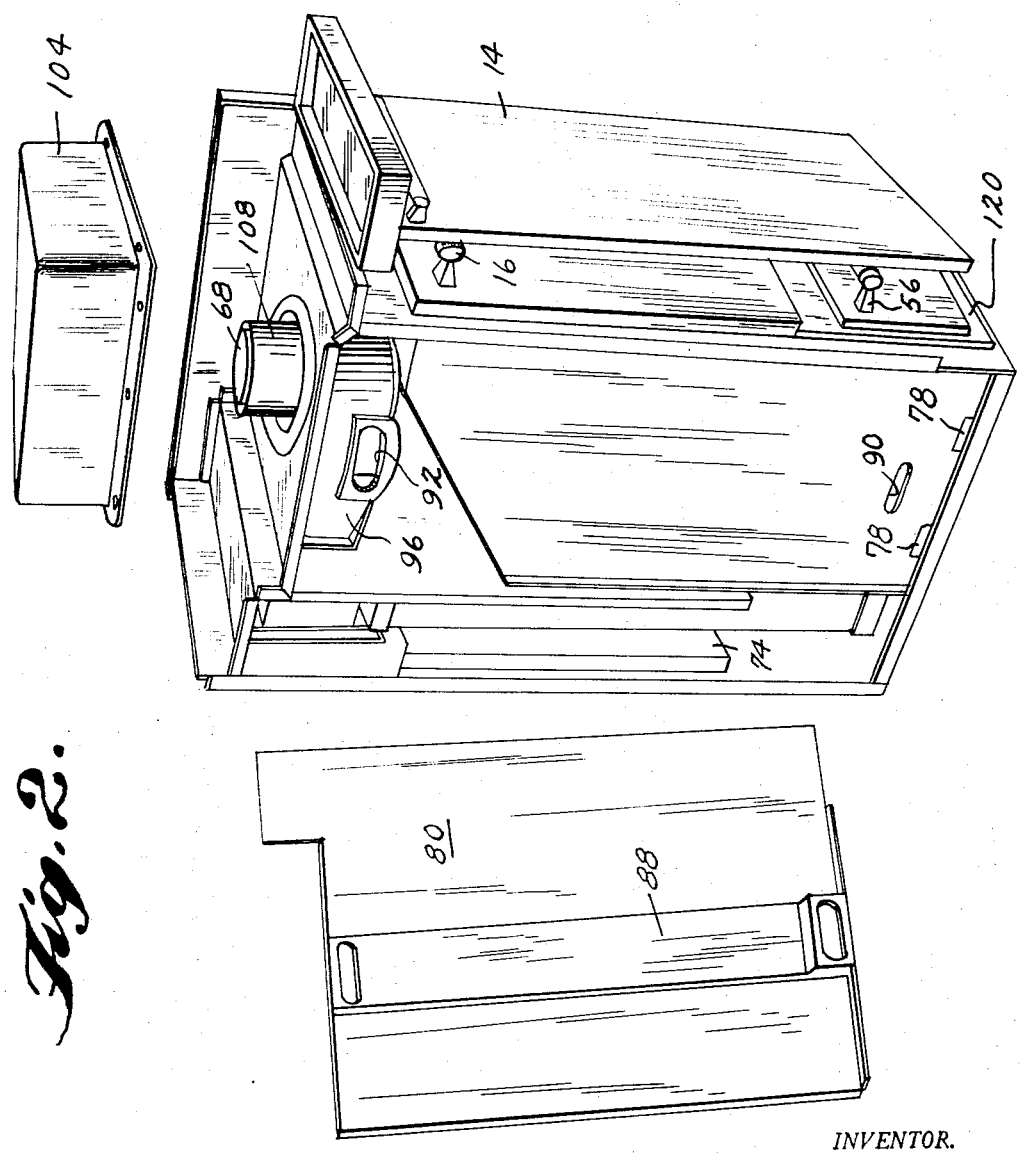
FIGURE 2 is a perspective view of the incinerator apparatus showing certain side panels removed.
Figure 3:
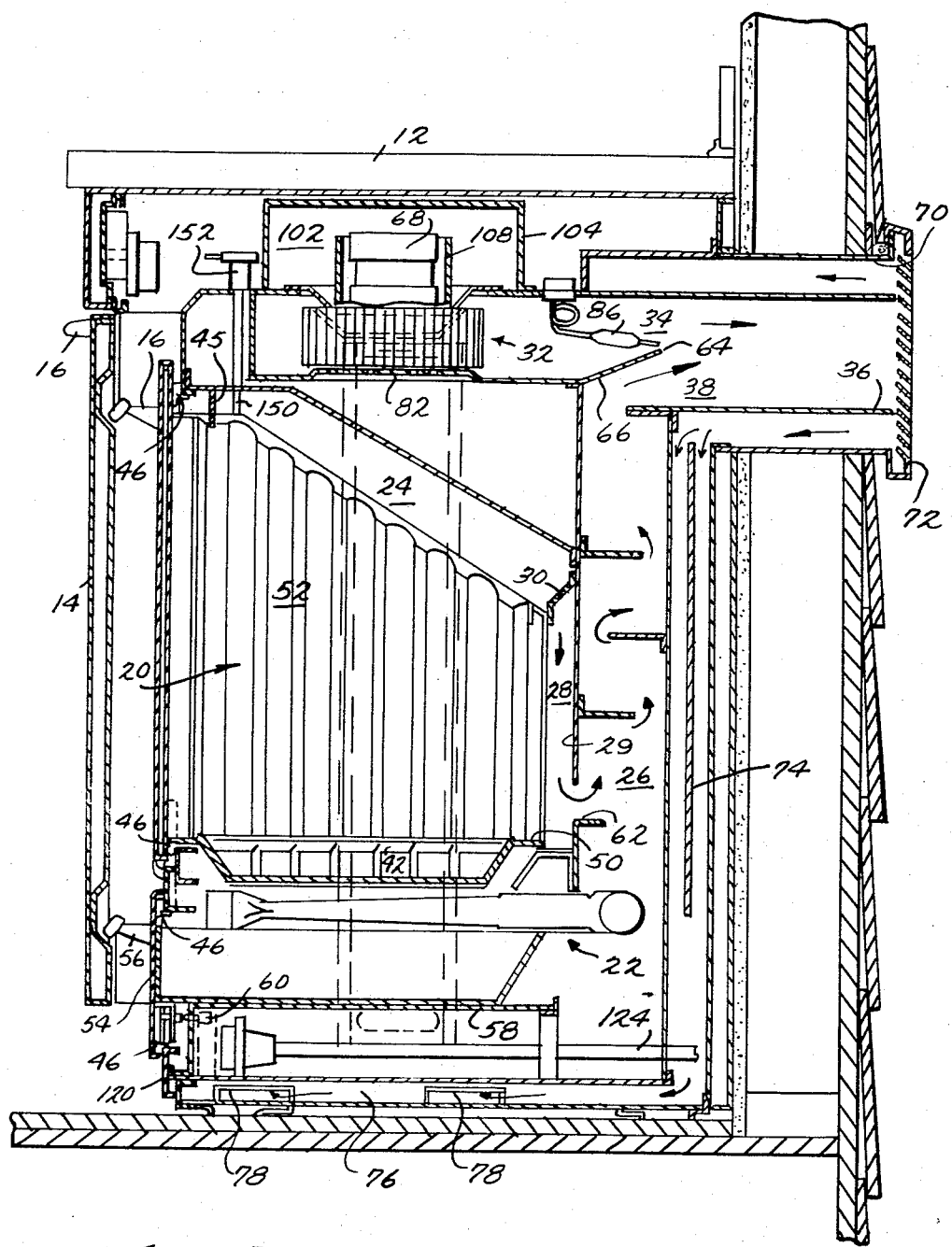
FIGURE 3 is an elevational cross section taken from a side view of the incinerator apparatus.
Figure 4:
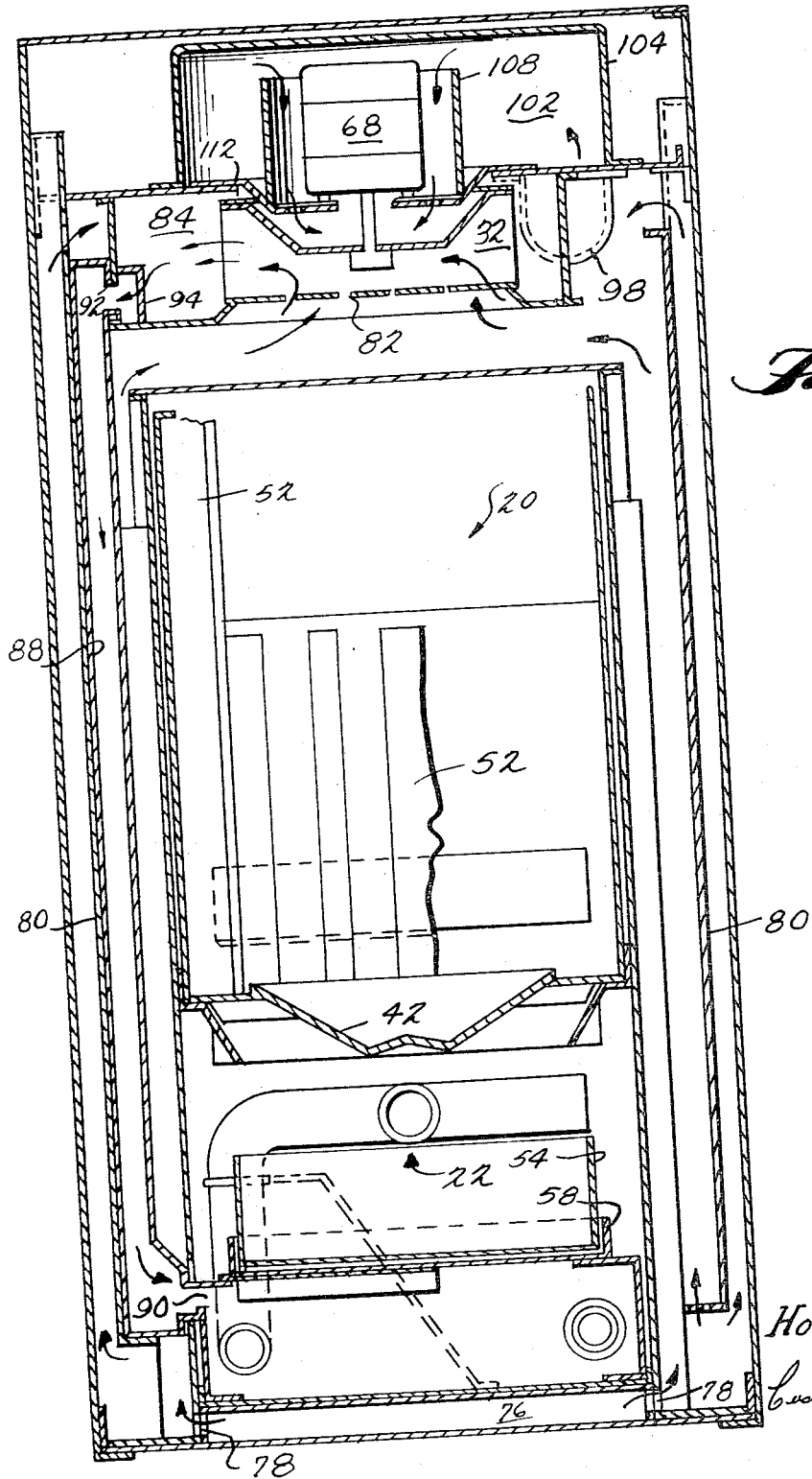
FIGURE 4 is a front elevational section of the same incinerator shown in FIGURE 3.

As shown in FIGURES 2–4, the interior of the housing includes a refuse receiving receptacle 20 which is mounted so that it can be tilted outwardly through a front opening in the housing. A handle 16 is provided on the front wall of the refuse receiving receptacle, and this handle provides for a means to move the receptacle forwardly for loading and backwardly to a normal upright position for burning refuse. Also, the incinerator includes a gas-fired burner means indicated generally at 22. The burner means 22 is mounted within a subassembly which may be easily removed from the lower part of the incinerator apparatus for servicing or maintaining parts of the burner and associated devices. The burner is constructed to maintain combustion in two separate combustion chambers 24 and 26. The first combustion chamber 24 is located within the confines of the refuse receiving receptacle 20, and the second combustion chamber 26 adjoins the first chamber and is in communication with the first combustion chamber through a passage 28. It will be appreciated that the passage 28 is formed by a back wall of the refuse receiving receptacle in its spaced position from the upright wall 29. A filtering screen 30 may be mounted above a back wall of the refuse receiving receptacle 20 so as to filter out oversized particles which might otherwise pass from the first combustion chamber 24 into the second combustion chamber 26. However, it has been found that filter screen 30 is not required in the incinerator of this invention because of the efficiency of combustion attained for normal domestic use.

A forced draft means in the form of a blower unit 32 is mounted near the top interior of the cabinet, and the blower forces an airstream through a blower passage 34 which is in communication with an exhaust vent means 36. The blower passage 34 passes by and is in communication with an outlet 38 from the second combustion chamber. As air is moved through the blower passage 34 to the exhaust vent 36, an entraining action is created past the outlet 38 so as to draw exhaust products from the burner zones through the incinerator and into the cooling exhaust stream of the blower. This action will be described in greater detail below.

Figure 1:
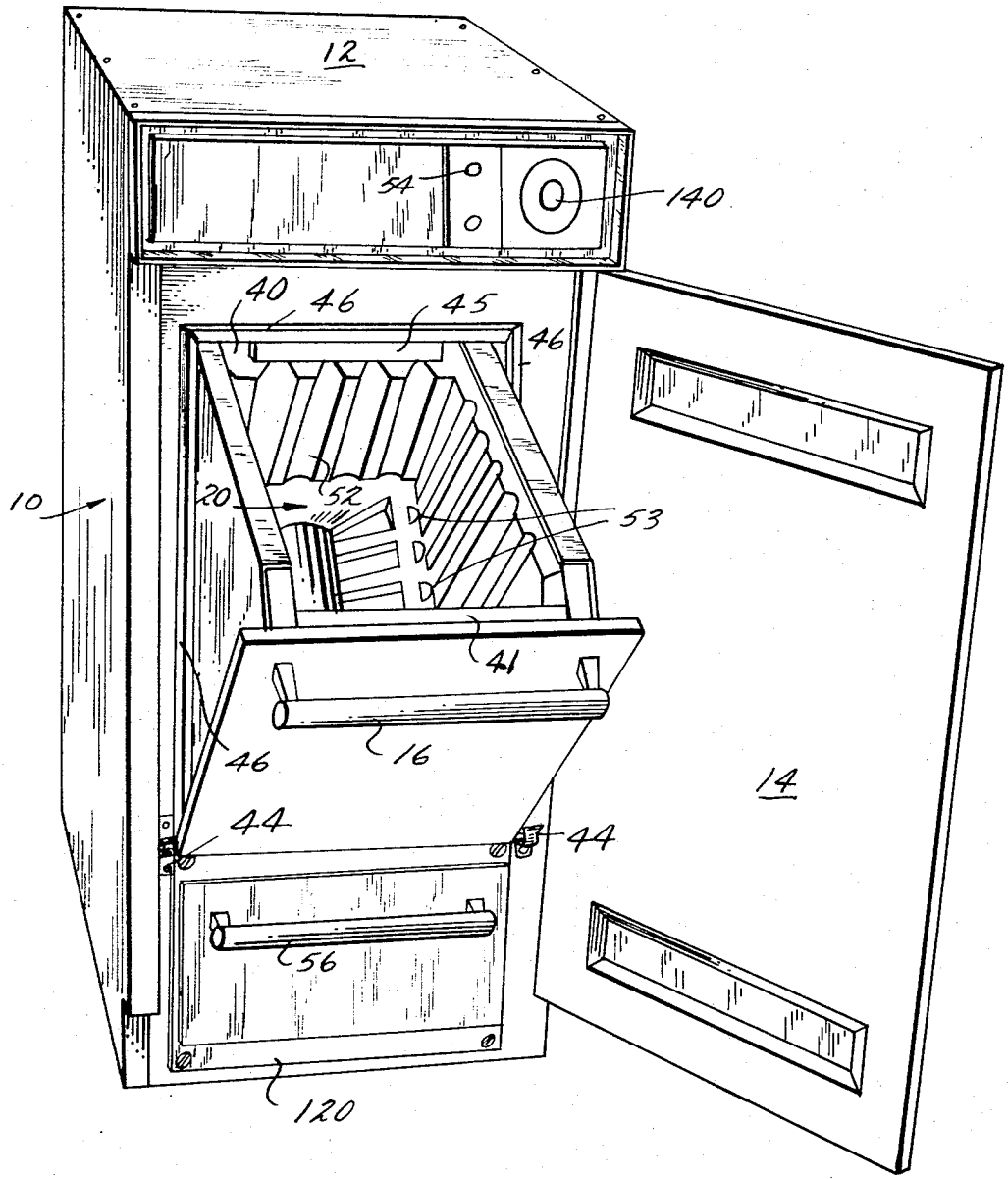
FIGURE 1 is a perspective view of the incinerator apparatus.

The refuse receiving receptacle is in the form of an open-topped receptacle having a back wall 40, a front wall 41, and side walls, as shown in FIGURE 1. The bottom of the refuse receiving receptacle is provided with a grate 42 which may be made of cast iron or other suitable material. The grate 42 includes open spaces which are small enough to prevent the falling of unburned refuse from the bottom of the receptacle, but which are large enough to permit oxygen bearing air to be drawn into the receptacle for the purpose of supporting combustion. The receptacle is supported for a pivotal tilting movement along its front edge on hinge elements 44 which are secured to the front framing panel of the housing. The hinges are open at their tops, and this form of hinge permits ease of tilting of the refuse receiving receptacle, and also allows the receptacle to be lifted upwardly for removal from the incinerator when necessary. The front marginal edges of the refuse receiving receptacle are sealed in their contact with the incinerator housing by continuous strips 46 of silicone rubber material surrounding the front opening in the housing. As shown in FIGURE 3, the back edge 50 of the grate 42 rests lightly on a framing member 52 for forming a seal at the back edge of the receptacle so that the burner flame will be directed through the grate and not around it. When it is desired to load the refuse receiving receptacle, the cabinet door 14 is opened, and the handle 16 of the receptacle is pulled forward so as to tilt the refuse receiving receptacle outwardly past the confines of the cabinet. Forward tilting of the receptacle is limited by a stop plate 45, which engages the upper edge of the back wall 40 when the receptacle is tilted all the way out. Loading is made from the top of the refuse receiving receptacle, and it can be seen that the back wall 40 is of a lower height than the front wall 41, and thereby the receptacle will present approximately level top edges for all four side walls when it is tilted forward into a loading position. The refuse receiving receptacle also includes a fire clay lining 52 on the four upright walls which form the receptacle. This lining serves as a heat resistant refractory material which prevents a burning out of the receptacle and adjacent portions of the incinerator from the high temperatures attained within the first combustion zone. As shown in FIGURE 1, the lining 52 extends all the way down to the level of the grate, and openings 53 are provided around the periphery of the grate and past the lining to provide a better draft around the entire grate structure. An ash drawer 54 is situated under the grate 42 of the refuse receiving receptacle, and the drawer 54 may be slid out by its handle 56 for easy removal of ashes which fall into and accumulate in the ash drawer. The ash drawer 54 is supported on a removable slide panel 58 which will be described in greater detail later. An opening is provided in the front of the incinerator housing to permit passage of the ash drawer into and out of the housing, and silicone rubber strips are positioned around the opening to seal the front edges of the ash drawer against the housing. The ash drawer also contacts and actuates a switch which prevents operation of the incinerator unless the drawer 54 is all the way in the housing.

Referring to FIGURE 3, a passageway 28, formed by the back wall of the receptacle and a wall 29 in the incinerator, connects the first combustion chamber 24 with the second combustion chamber 26. The passageway 28 directs combustion products from the top of the first chamber 24 through an opening 62 and into the lower part of the second combustion chamber 26; and this gives the combustion products a desired after-burning treatment which substantially reduces smoke and odor products. Of course, it is to be understood that the chambers 24 and 26, together with the passageway 28, have side walls which further define the chambers, and cause the combustion products to follow the flow paths illustrated in FIGURES 3 and 4 from the chamber 24 to the exhaust vent 36. The chambers 24 and 26 are also constructed to confine the burning actions to the chambers themselves and away from the rest of the incinerator.

It is in the second combustion chamber 26 that offensive smoke particles, and even odors, are reduced and burned, and this is important for air pollution prevention. The second combustion chamber is further provided with baffle members 58 which act to confine and to throttle particles and gases within the burning zone for maximum burning efficiency. The baffle members are staggered, as shown in FIGURE 3, to provide a tortuous path for exhaust products leaving the chamber 26, and this assures a complete combustion of essentially all matter which can be burned in that chamber. The second combustion chamber 26 extends upwardly along the back side of the incinerator housing interior, and this chamber, as is the remainder of the incinerator, is defined by sheet metal or any other suitable heat resistant material which has been formed and assembled, as indicated. An example of suitable heat resistant material for use in the incinerator construction is porcelainized sheet metal. The upper end of the chamber 26 is terminated by an outlet 38 which is interposed in the blower passage 34. The relationship of the outlet 38 to the blower airstream in the passage 34 causes an entraining action by the airstream which draws combustion products from the outlet 38, and the outlet 38 is of such a shape and size that a venturi action is created by the movement of the blower airstream past the outlet. It has been found that an optimum relationship between the outlet 38 and the blower passage 34 is obtained when the trailing edge 64 of the baffle 66 is adjusted until the area of the outlet 38 is approximately equal to the area of the blower passage 34. This relationship, as combined with a controlled intake of fresh air into the combustion chamber, results in a substantial decrease in the percentage of $CO$ and $CO_2$ at the outlet of the second combustion chamber 26.

The high capacity blower means 32 is mounted within the incinerator unit, and is preferably located near the top of the unit as indicated in FIGURES 3 and 4. The blower means provides for a variety of functions including an admission of oxygen bearing air into the incinerator housing; a removal of exhaust products out of the housing and away from the building; and a cooling action for exhaust gases and for the entire incinerator housing, resulting in a safer operation of the incinerator in the home. The blower means is driven by an electrical motor 68 which is connected to the blower for rotating impeller elements associated with the blower unit. A novel means for cooling the electric motor 68 is provided by tapping a portion of the cool air which is being drawn into the incinerator housing so that the portion (approximately 10 percent of all incoming air) is diverted for cooling the electric motor.

FIGURES 2, 3, and 4 illustrate the panel structures which are included in the incinerator apparatus for the purpose of controlling air flow and for shielding adjoining structures from the heat produced within the incinerator. As seen in the sectional views of FIGURES 3 and 4, air is drawn into the incinerator housing by the action of the blower 32. Since the housing is essentially hermetically sealed from the atmosphere of the room in which it is placed, all air which is drawn into the incinerator is pulled from an outside atmosphere. An intake and exhaust duct combination is provided at the rear of the housing and through a wall structure of a building in which the incinerator is installed. Outside air is drawn into an intake duct 70 which surrounds an exhaust duct 36. The intake duct is formed by providing a coaxial sleeve construction spaced around the exhaust vent 36, as shown, and thus the movement of fresh air through the duct serves to substantially cool the exhaust vent structure where it passes through a wall of the building. This cooling feature results in a much safer installation of the incinerator device for household use. A louvered covering 72 on the terminal ends of the ducts (as also shown in FIGURE 5) covers the combination of ducts and provides for a finished appearance to the outside of the building. Although the exhaust vent has been illustrated as passing directly through an outside wall of a building, a similar structure could be provided for a vertical vent rising upwardly within a wall structure for ultimate venting to an atmosphere at the top of the wall structure. The alternative exhaust vent could be provided with a sleeve construction spaced about the outer surface of the vent structure or it could be used with an incinerator of the type where cooling air is drawn from the atmosphere within the room.

The main blower means 32 is of such a capacity that air is drawn into the incinerator by way of the inlet duct 70 described above. Upon admission into the incinerator housing, the air is drawn downwardly along the outside surface of the afterburner chamber, and around a radiation shield 74. The air passes into a bottom chamber 76, and from there is forced outwardly through the ports 78 for movement upwardly along the sides of the incinerator and past radiation shields 80. Ultimately the air is received into the blower inlet 82 and is expelled from the blower outlet 84 and into the passage 34. As already discussed, the volume of air which is moved through the passage 34 acts to entrain exhaust gases and products from the chamber 26 and to force such products outwardly away from the incinerator housing through the exhaust vent 36. Additionally, the mixture of the airstream from the blower with the gas products from the chamber 26 results in a substantial cooling of the exhaust products and this permits an easier and safer installation of the incinerator in its household use. A temperature sensing device 86 is positioned in the blower outlet passage 34 for measuring the mixture temperature of exhaust gases, and control connections are provided for closing a solenoid valve for gas supply in the event that the exhaust temperature rises to an unsafe level, such as, upon blower failure.

In addition to airstreams which are established for cooling the walls of the incinerator housing and for reducing the temperature of exhaust products leaving the chamber 26, the blower means 32 also provides for bypassing a predetermined quantity of air through a duct 88 into the lower level of the incinerator where such air is admitted to support combustion in the chambers 24 and 26. For this purpose, the bypass duct 88 is interconnected between a positive pressure side of the blower housing and a lower part of the incinerator. The bypass duct 88 may be provided with an automatically operated damper means for controlling the flow of air therethrough; but in its preferred form, it is constructed as illustrated in FIGURES 2 and 4 without a valve or damper included in the duct. The lower end of the bypass duct enters through a port 90 of the combustion chamber side wall where the air can be received for supporting a flame in the burner means 22 and for supporting combustion in chambers 24 and 26. The upper end of the bypass duct 88 receives air through an opening 92 formed through the blower housing on the positive pressure side of the blower. An air scoop 94 is provided within the blower housing for deflecting a sufficient quantity of air to the combustion area to support combustion and to control burning within American Gas Association requirements. In this manner, a means is provided for moving positive pressure air into the combustion zones of the incinerator, and complete combustion is thereby assured.

FIGURE 5 illustrates a back perspective view of the incinerator unit and shows the intake and exhaust ducts associated with the unit. As described above, the intake duct 70 is positioned coaxially around the exhaust duct 36 so that fresh air which is being drawn into the unit will serve to substantially cool the exhaust duct and to insulate the combination of ducts from a building wall through which they pass. The louvered cover 72 is attached to the terminal ends of the two ducts to provide a protective cover for the outside of the unit.

Figure 6:
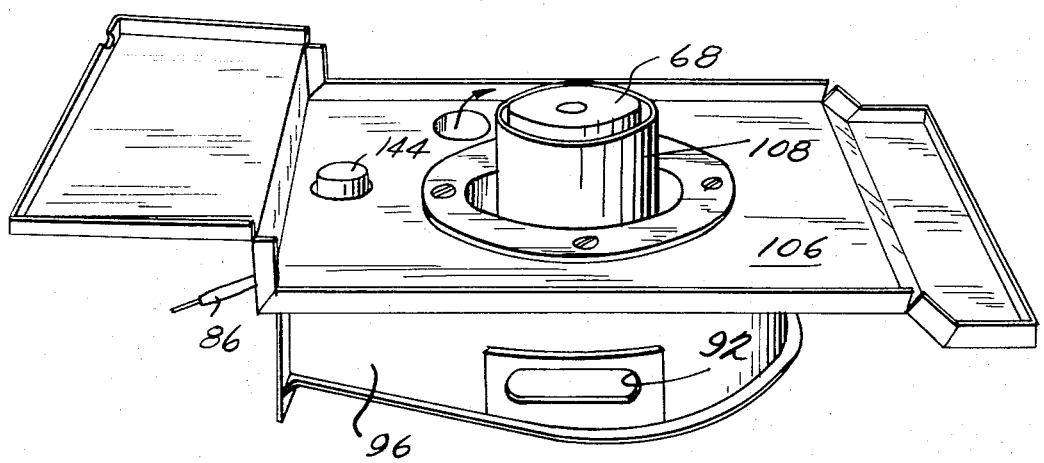
FIGURE 6 is an outside perspective view of the blower unit and showing the electrical motor means associated therewith.
Figure 7:
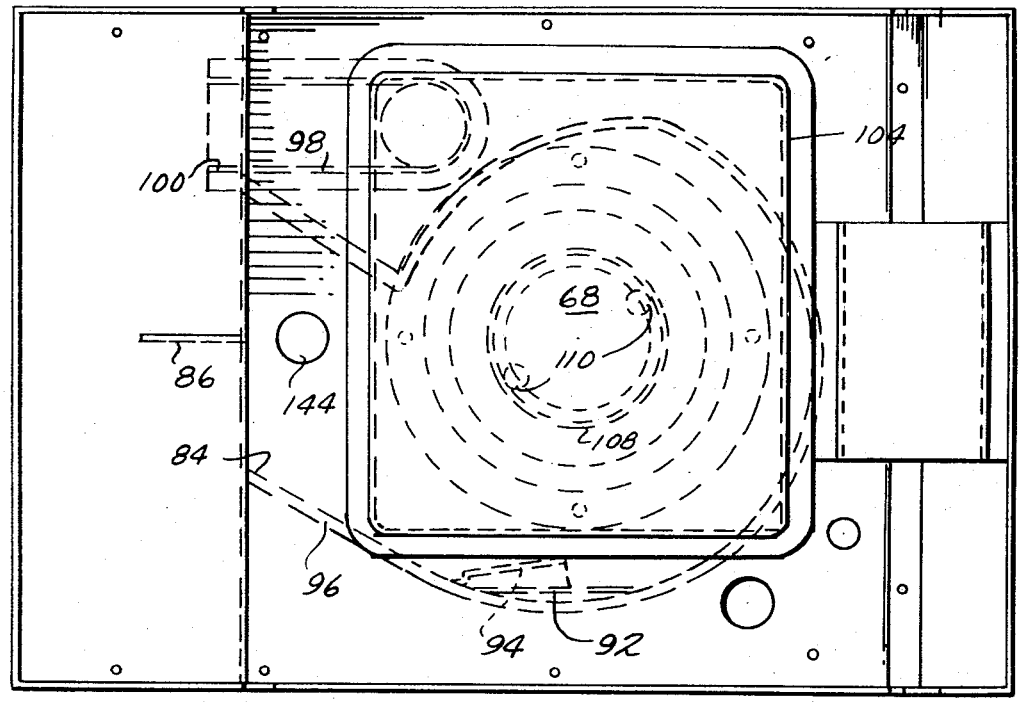
FIGURE 7 is a top plan view showing the blower means and associated structure for cooling the electric motor.
Figure 8:
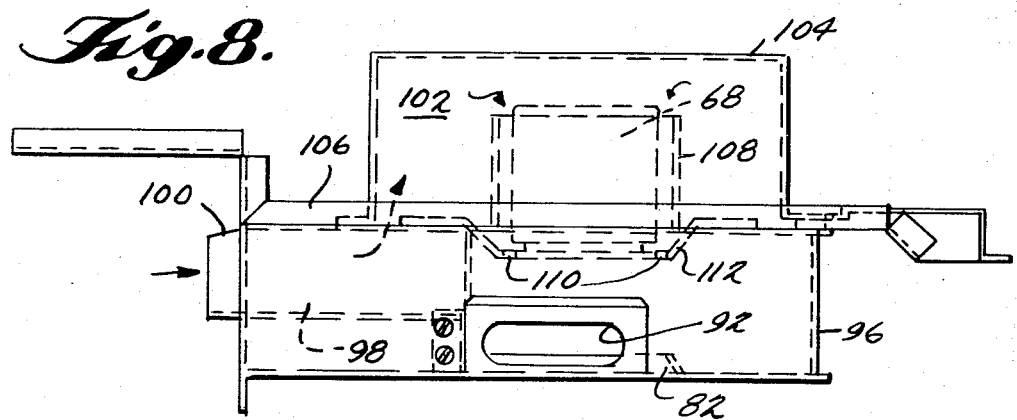
FIGURE 8 is a vertical sectional view of FIGURE 7 and showing the blower unit structure.

FIGURES 6 through 8 illustrate the detailed construction for the blower means 32 and the associated devices for controlling air into and out of the blower means. The blower is of a conventional type having impeller elements carried for rotation within a housing 96. An electric motor 68 is drivingly connected to the impeller elements for rotating the elements and for creating an airstream. Air is drawn into the blower through the inlet 82, and air is discharged from the housing outlet 84. As mentioned above, the blower means includes a novel system for cooling the electric motor 68. Because of the high temperature conditions within the incinerator, the electric motor requires substantial cooling in order to operate for the lengths of time required in operating the incinerator device. For this purpose, a system is provided wherein a portion of the incoming air, which is being drawn into the incinerator housing, is tapped off and directed around the electric motor 68 for cooling the motor. An air scoop 98 having an inlet end 100 receives a portion of the air entering the incinerator housing (see FIGURE 4). The air scoop 98 communicates with a chamber 102 which is formed over the electric motor 68. The chamber is formed by installing a shroud 104 over the top of the electric motor, and the shroud is installed in an air tight relationship to a top plate 106 so that air which is transferred into the chamber 102 will necessarily pass around the electric motor 68. A cowling 108 is installed around the motor in a coaxial relationship so that air entering the chamber 102 will be caused to flow around the outer surfaces of the electric motor. Openings 110 are provided through a mounting plate 112 for permitting the passage of air into a low pressure portion of the blower itself. Thus, upon actuation of the blower means 32, air is drawn into the entire incinerator housing, and a minor portion of the air is used for cooling the electric motor 68 while a major portion of the air is received into the inlet 82 of the blower. FIGURE 7 also illustrates the air scoop 94 associated with the bypass duct 88. The scoop 94 is positioned on the high pressure side of the blower housing to receive a portion of the blower airstream and to transfer the airstream portion downwardly through the bypass duct 88.

The burning means for the two combustion chambers 24 and 26 is indicated generally at 22 and is illustrated as a gas-fired burner, although an electrical heating and igniting means may be substituted for the gas-fired means. The illustrated gas burner means includes conventional gas burners, with the ports of the burners being ignited by a pilot light or sparking device connected to controls of the incinerator. Also, the gas burning means 22 has conventional connections and controls for supplying and regulating a gas flame into the separate combustion chambers of the incinerator unit. In its preferred form, the burning means 22 is shaped in the form of a "T" having a central element 114 and a cross element 116. The two elements 114 and 116 are interconnected so that a fuel gas mixture is carried throughout their lengths for burning through ports arranged along the two burner elements. The central element 114 provides for a gas flame underneath the incinerator grate 42 in the combustion chamber 24, and this first burner element provides for a dehydration and ignition of refuse placed within the refuse receiving receptacle 20. The cross element 116 provides for a gas flame in the second combustion chamber 26, and this second burner element provides an afterburning action in the second combustion chamber. The second burner element 116 is designed to provide temperatures up to 950° F. in the second combustion chamber and such high temperatures serve to eliminate offensive smoke and odors from being discharged from the incinerator.

Figure 11:
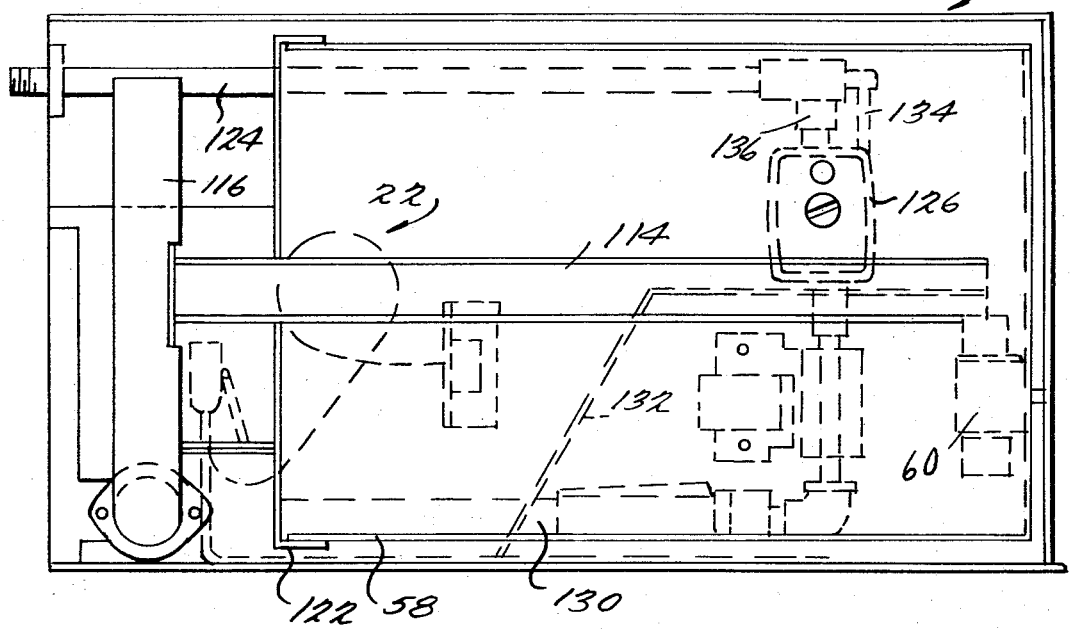
FIGURE 11 is a top plan view of the subassembly unit of FIGURE 9.
Figure 9:
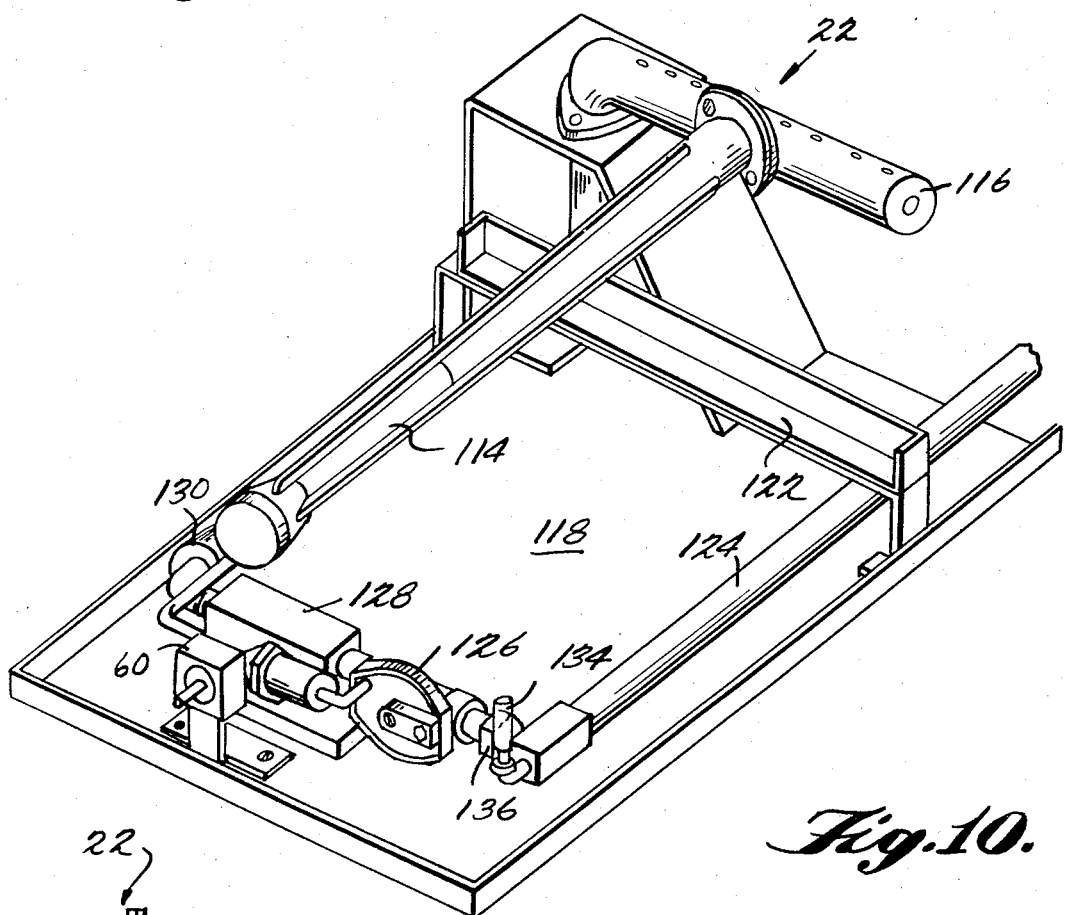
FIGURE 9 is a perspective view of a subassembly unit for containing the burning devices associated with the incinerator.
Figure 10:
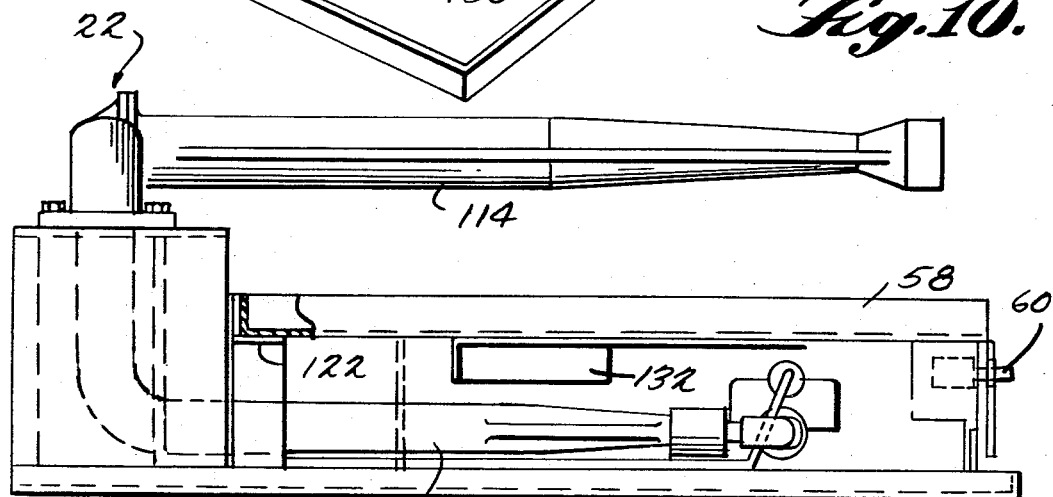
FIGURE 10 is a side elevational view of the subassembly unit of FIGURE 9.

As shown in FIGURES 9–11, the entire burner means 22 is mounted in a subassembly unit 118 which can be easily removed from the base portion of the incinerator housing 10. The subassembly unit 118 is in the form of a tray which can be removed from the lower part of the incinerator housing by pulling the tray and its associated structures forwardly through an opening in the front of the incinerator. A front plate 120 is mounted on the lower front portion of the incinerator, and this plate includes an opening for passage of the ash drawer 54 in and out of the incinerator. However, when it is desired to remove the subassembly 118 from the incinerator it is necessary to first remove the front plate 120 from its mounted position. The tray includes the burner means 22 and associated control and regulation apparatus, together with other devices which will be discussed. Also, means are provided for disconnecting the main supply of gas and electrical service from the structures in the tray prior to the removal of the entire subassembly unit 118. The subassembly unit 118 includes a base portion having a support ledge 122 for supporting the inner edge of the ash drawer slide panel 58. With the slide panel 58 in position, the ash drawer 54 can rest upon the slide panel in a position beneath the burner means 22 and above the control devices contained within the subassembly unit. The advantage in a subassembly unit resides in the ease with which the entire burner structure and all associated devices can be removed for maintenance or replacement purposes. Upon sliding the subassembly unit out of the housing 10 of the incinerator, all burner elements, valves and control devices can be easily serviced or replaced as is necessary. Further, this feature meets an American Gas Association requirement that the incinerator be serviceable from the front and without removing the incinerator away from its installed position.

Referring to FIGURE 9, the subassembly unit provides for a mounting of a gas supply conduit 124 and various regulator and control devices, such as a pressure regulator 126 and a solenoid operated valve 128. The gas supply is carried to the burner means 22 through a mixing tube 130 which extends along one side of the tray and rises upwardly to communicate with the cross burner element 122 at one end thereof. From there, the fuel mixture is carried throughout the entire burner means 22 where it is ignited and burned through the plurality of ports. The burner means 22 is mounted above the base of the tray so as to be positioned immediately below the grate 42 when the subassembly unit is contained within the lower part of the incinerator housing. Sufficient space is provided between the upper level of the burner means 22 and the lower level of the control elements so that the ash drawer slide panel 58 can be inserted and contained within the subassembly unit for supporting the ash drawer 54 during the normal operation of this incinerator. The slide panel 58 also functions as a heat shield to protect the control elements carried in the base of the subassembly unit, and a deflector vane 132 (see FIGURES 10 and 11) is carried on a lower surface of the panel for directing cooling air from the bypass duct 88 forwardly toward the control devices. After being deflected forwardly the air may then rise upwardly to support combustion in the burner region. Of course, the ash drawer 54 can be separately removed for emptying, as required, without removing the entire subassembly unit 118.

When it is desired to remove the subassembly unit for servicing or repair, the ash pan is removed and the front panel 120 is taken out from its mounted position. Then, the slide panel is removed, and gas and electrical services are disconnected before taking out the subassembly unit. For disconnecting the gas service, a manually operated valve 134 is moved to close the gas supply line 124. Then the union 136 is turned to disconnect the gas supply from the remainder of the apparatus in the subassembly. Electrical service is disconnected by a conventional plug means which can be disconnected from a socket carried on one of the inner walls of the incinerator. When the gas supply line 124 has been disconnected at 136, and after the electrical service has been disconnected, the entire subassembly unit can be pulled forwardly, with the disconnected end of the gas supply conduit 124 remaining in place. When the subassembly unit is to be replaced into the incinerator housing, it is only necessary to slide the tray back into position and to reconnect gas and electrical services. Once the unit is in place, the slide panel, front panel, and ash drawer can be replaced. An electrical sparking means may be mounted within the subassembly unit for igniting the gas jets of the burner means 22. The starting means is of a conventional construction and is connected to control devices for automatically igniting the burner when a timer control is actuated.

FIGURE 12 schematically illustrates certain control and safety devices for use with the incinerator of this invention. Conventional connections are provided to connect the various control devices to a source of electricity, and these connections together with other well known systems are omitted from the drawings for clarity. The gas mixture to the main burner 22 is controlled through a solenoid operated valve 128, and a plurality of control systems are connected in series with the valve 128 so that any one of the plurality of devices can open the circuit to the solenoid gas valve and thereby prevent passage of gas mixture into the system. A normally open timer device 138 closes the circuit to the solenoid valve when the timer is manually actuated, as by pressing the button 140 for beginning a preset cycle of operation for the incinerator. A normally open flame switch 142 is closed by heat from a pilot burner seated near the flame switch so as to impinge a flame upon the switch. The pilot flame must be operating and the flame switch closed to complete the circuit to the solenoid valve 128. The ash drawer switch 60 is actuated to an open position when the ash drawer is pulled forwardly, and operation of the incinerator is thereby prevented unless the ash drawer is securely in place. Finally, a normally closed high limit switch 144 is opened in the event that flue gases become excessively hot due to a blower failure, or for any other reason. The temperature of the flue gases is measured by the sensing device 86, and this temperature indication operates the high limit switch 144.

For igniting the burner means 22 a solid state igniter 146, having capacitors, resistors, and an ignition coil capable of producing an intermittent spark whenever energized, is placed in circuit with a sparking means 148. The igniter is energized as soon as the appliance is connected to a power source, and the igniter is disconnected by a closing of the flame switch 142 upon operation of the pilot burner. If the pilot flame is extinguished, the flame switch will open and the igniter will once again become energized.

The timer 138 includes an electric motor and three normally opened contacts. When the timer is manually actuated by the user, the circuit is closed to the timer motor so as to start a preset cycle of operation for the incinerator. This starts the operation of the blower 32, and the circuit to the blower remains closed until the entire preset cycle is completed. Actuation of the timer also closes the circuit to the main burner solenoid 128 for permitting passage of gas through the valve and to the burners. This circuit remains closed until approximately 15 minutes before the end of the preset cycle. In this manner, the blower continues to operate until the end of the preset cycle, and for approximately 15 minutes beyond the end of the burning operation, so that the incinerator is completely cooled to a safe level and residual flue products are exhausted. FIGURE 12 also illustrates a door locking means in the form of a plunger 150 operated by the solenoid switch 152. The plunger engages a portion of the refuse receiving receptacle of the unit, and the receptacle cannot be opened until the plunger has been retracted by energizing the solenoid 152. The plunger is normally retracted by pushing the push button 154, however the circuit to the door switch 154 is bypassed by the timer switch when the incinerator is in operation, and therefore the door cannot be opened at that time. The circuit to the door switch 152 does not close until the preset cycle has been completed, and only then can a user press the button 154 and retract the door plunger 150.

Although the timer 138 has been illustrated as a push button type of actuation, an alternative type of timer would include a manually operated knob which could be rotated to a desired burning cycle.

Of course, where electric burner means are used in place of gas burners, there is no requirement for all of the circuiting and control devices which are associated with a safe supply of a gas mixture to gas-fired burners.

In operation, the incinerator is loaded by first opening the outer door 14 of the cabinet housing. Then the user releases the refuse receiving receptacle by pressing the switch 154 which retracts the plunger 150. The successful retraction of the plunger 150 assumes that the unit has completed any previous operating cycles and that the circuit to the switch 154 is closed for actuating the plunger 150. With the refuse receiving receptacle tilted to an open position, as shown in FIGURE 1, the receptacle may be loaded from its top by dropping a bundle of waste into the receptacle. Then the receptacle is tilted to a closed position, and the user checks the ash drawer to make sure that is is firmly in place. The outer door 14 is closed and the unit is ready for actuation. When the refuse receiving receptacle is tilted back into a closed position, the plunger 150 engages the receptacle and automatically locks the same in a closed position. The incinerator is started by actuating the control button 140 of the timer 138, and this closes circuits to the blower motor, the solenoid valve 128 and a circuit which bypasses the door switch 154. The operation of the solenoid operated valve 128 and the blower motor assumes that a pilot is lighted so as to close the flame switch 142. In the event that the pilot has failed, or has not been separately lighted (as required in a non-automatic pilot lighting system), the gas valve will not be actuated to admit gas to the burners. However with the pilot lighted, gas will be admitted to the burners and the burner will be started. Any opening of the ash drawer of the cabinet will disconnect the burner circuit, and as already described, the refuse receiving receptacle cannot be unlocked until the complete cycle has finished. The occupants of a home are still further protected by the delayed action of the timer switch 138 which prevents an unlocking of the receptacle until after a burning cycle has been completed and a 15-minute cooling cycle has followed. After the period of time has expired for the complete cycle, the refuse receiving receptacle may be opened by once again pressing the door switch 154.

Figure 13:
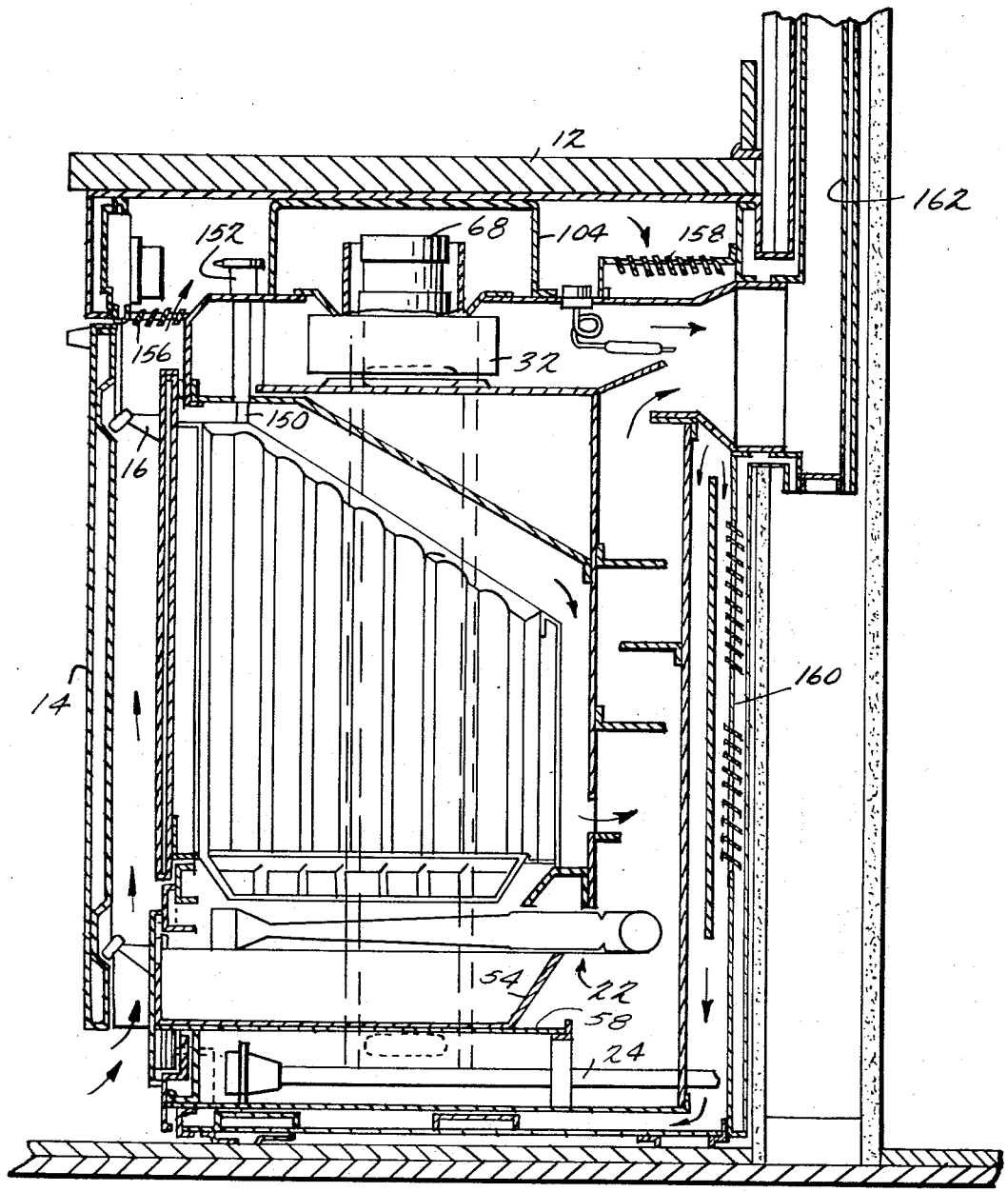
FIGURE 13 is an elevational cross section corresponding to the section shown in FIGURE 3, but illustrating an alternative construction for the incinerator.

FIGURE 13 illustrates a second embodiment of the present invention, and this embodiment utilizes room air for supporting combustion and for cooling the unit. In both embodiments, the normal operation of the blower means 32 creates a negative pressure within the burning chambers, and this feature normally prevents any backfiring of gases or smoke into the room in which the incinerator is located. The preferred embodiment has the advantage of using no room air to support combustion within the incinerator, and as a result pressure conditions within a room or home are not radically changed by the operation of the device. In certain installations of the incinerator, it may be acceptable to use room air for supporting combustion, and the FIGURE 13 embodiment is useful for such installations.

The FIGURE 13 incinerator includes many of the same elements of the preferred embodiment, with the major changes comprising the air flow pattern into the incinerator. Air is drawn into the front of the incinerator past an opening at the lower end of the door 14, and as shown by the arrows, the incoming air is drawn into the upper part of the incinerator through the grill section 156. From there the air passes over the top of the incinerator and downwardly through the grill section 158 for passage around the exhaust vent and down the back outside wall 160, as with the preferred embodiment. From there the air follows the same flow pattern downwardly to the base of the incinerator and upwardly along the side walls and past radiation shields contained along the sides of the incinerator. The means for cooling the motor and for carrying air through a bypass duct to the combustion zone are identical to the structure described in the FIGURE 1 embodiment. The exhaust vent 162 of the FIGURE 13 incinerator is of a vertical type for use in buildings where an exhaust cannot be made directly through a wall and to an outside atmosphere. Alternatively this same incinerator could have a horizontal exhaust through a building wall.

Although the incinerator apparatus has been described with reference to preferred embodiments, it is contemplated that many changes may be made within the scope of this invention. For example, it may be desired to provide a cabinet door in the top of the cabinet rather than in the front wall, and with a top door, access could be made directly to the open top of the refuse receiving receptacle. In such a structure, the top door and blower unit would have to be arranged so as to not interfere with each other.

Other modifications will be apparent to those skilled in the art and such modifications are intended to be included in the scope of this invention.

What is claimed is:

1. In an incinerator apparatus having a refuse receiving receptacle and gas burner means for burning refuse in said refuse receiving receptacle, the improvement comprising:
    means for hermetically sealing the entire incinerator from the atmosphere of the room in which it is installed when said incinerator is in operation,
    exhaust vent means in communication with an atmosphere external to the room in which the incinerator is installed for exhausting burned products from said incinerator,
    air intake means in communication with said atmosphere external of the room in which said incinerator is installed for supplying cooling and combustion air to said incinerator device,
    forced draft means carried by said incinerator for forcing exhaust products from the incinerator and for drawing cooling and combustion air into said incinerator from said external atmosphere only, and including an air passage means between said forced draft means and the gas burner means of said incinerator for moving positive pressure air to the burner region of said incinerator, whereby combustion air is supplied to the burner region by said forced draft means.

2. The improvement of claim 1 wherein said forced draft means is located at a top portion of said incinerator, and wherein said air passage means interconnects the forced draft means at the top portion of the incinerator with the burner means located at a bottom portion of said incinerator.

3. The improvement of claim 1 wherein said forced draft means comprises a blower which is driven by an electric motor means, said blower having an air outlet for creating an exhaust stream of air to said external atmosphere and including an air inlet for drawing an airstream of cooling and combustion air into said incinerator from said atmosphere external of the room in which the incinerator is installed, said electric motor means being cooled by a portion of said stream of cooling and combustion air by an air scoop means which diverts and receives a portion of the air being drawn into the incinerator housing by the blower and including means for passing air received by the air scoop means around the electric motor of said blower.

4. An incinerator apparatus for burning refuse comprising:
    a cabinet housing,
    a refuse receiving receptacle within said housing for receiving the refuse to be burned, said refuse receiving receptacle being a first combustion chamber for igniting and burning the refuse, wherein said refuse receiving receptacle has side walls, an open top for receiving the refuse, and an open grate bottom for admitting air to the refuse receiving receptacle when it is burning, and wherein said refuse receiving receptacle is mounted for pivotal movement about a point at its base, whereby the refuse receiving receptacle may be tilted outwardly away from the enclosure of the cabinet housing for ease of filling,
    a second combustion chamber within said housing and communicating with said first combustion chamber, for receiving and burning combustion products from said first combustion chamber,
    burner means associated with said first and second combustion chambers for igniting and burning refuse placed in the incinerator,
    forced draft means for drawing cooling air through and around said housing, and for entraining and cooling hot exhaust gases from said second combustion chamber with airstream produced by said forced draft means, said forced draft means having an air inlet in communication with an atmosphere external to a room in which the incinerator is installed for drawing all cooling and combustion air into said incinerator from said external atmosphere only.
    an exhaust vent communicating with the forced draft means and with said second combustion chamber for carrying exhaust gases to said external atmosphere, and
    means for hermetically sealing the entire incinerator from the atmosphere of the room in which it is installed when said incinerator is in operation, whereby all combustion and cooling air is drawn only from an external atmosphere and whereby no gases or combustion products from within said incinerator can pass into the room in which the incinerator is installed.

5. An incinerator apparatus as claimed in claim 4 wherein said burner means comprises gas-fired burners.

6. An incinerator apparatus as claimed in claim 4 wherein said burner means comprises electric burner means.

7. An incinerator apparatus for burning refuse comprising:
    a cabinet housing,
    a refuse receiving receptacle within said housing for receiving the refuse to be burned, said refuse receiving receptacle being a first combustion chamber for igniting and burning the refuse,
    a second combustion chamber within said housing and communicating with said first combustion chamber, for receiving and burning combustion products from said first combustion chamber,
    burner means associated with said first and second combustion chambers for igniting and burning refuse placed in the incinerator,
    forced draft means for drawing cooling air through and around said housing, and for entraining and cooling hot exhaust gases from said second combustion chamber with the airstream produced by said forced draft means, said forced draft means having an air inlet in communication with an atmosphere external to a room in which the incinerator is installed for drawing all cooling and combustion air into said incinerator from said external atmosphere only, an exhaust vent communicating with the forced draft means and with said second combustion chamber for carrying exhaust gases to said external atmosphere, means for hermetically sealing the entire incinerator from the atmosphere of the room in which it is installed when said incinerator is in operation, whereby all combustion and cooling air is drawn only from an external atmosphere and whereby no gases or combustion products from within said incinerator can pass into the room in which the incinerator is installed, and a subassembly unit contained within a base portion of said incinerator for holding the burner means of said incinerator, said subassembly unit being mounted for removal from the incinerator, whereby the burner means and associated devices can be removed from their normal operating positions within the incinerator by removing the entire subassembly unit.

8. The incinerator apparatus of claim 7 wherein said burner means comprises gas-fired burners.

9. The incinerator apparatus of claim 7 wherein said burner means comprises electric burner means.

References Cited

UNITED STATES PATENTS

| | | | |
|---|---|---|---|
| 452,831 | 5/1891 | Brown | 237—1 |
| 595,952 | 12/1897 | Laroche | 126—58 |
| 1,906,023 | 4/1933 | Tobin | 110—11 X |
| 2,598,067 | 5/1952 | O'Brien | 110—18 |
| 2,647,506 | 8/1953 | Heiman | 126—110 |
| 2,763,760 | 9/1956 | Buckle | 110—8 |
| 2,929,342 | 3/1960 | Young. | |
| 3,043,248 | 7/1962 | Martin | 110—8 |
| 3,044,421 | 7/1963 | Franzheim | 110—8 |
| 3,104,629 | 9/1963 | Crawford et al. | 110—8 |
| 3,150,619 | 9/1964 | Brucken et al. | 110—8 |
| 3,211,079 | 10/1965 | Carlson | 126—116 X |
| 3,227,114 | 1/1966 | Anderson | 110—9 |

FREDERICK L. MATTESON, Jr., *Primary Examiner.*

H. B. RAMEY, *Assistant Examiner.*